(12) United States Patent
Holmes

(10) Patent No.: US 10,343,393 B2
(45) Date of Patent: Jul. 9, 2019

(54) METHOD OF MANUFACTURING PATTERN AND APPARATUS THEREFOR

(71) Applicant: DE LA RUE INTERNATIONAL LIMITED, Basingstoke, Hampshire (GB)

(72) Inventor: Brian William Holmes, Fleet (GB)

(73) Assignee: DE LA RUE INTERNATIONAL LIMITED, Basingstoke (GB)

(*) Notice: Subject to any disclaimer, the term of this patent is extended or adjusted under 35 U.S.C. 154(b) by 449 days.

(21) Appl. No.: 15/021,629

(22) PCT Filed: Sep. 26, 2014

(86) PCT No.: PCT/GB2014/052914
§ 371 (c)(1),
(2) Date: Mar. 11, 2016

(87) PCT Pub. No.: WO2015/044671
PCT Pub. Date: Apr. 2, 2015

(65) Prior Publication Data
US 2016/0229174 A1   Aug. 11, 2016

(30) Foreign Application Priority Data

Sep. 27, 2013 (GB) .................................. 1317195.4
Oct. 22, 2013 (GB) .................................. 1318683.8

(51) Int. Cl.
*B41F 7/04* (2006.01)
*B41M 1/02* (2006.01)
(Continued)

(52) U.S. Cl.
CPC .................. *B41F 7/04* (2013.01); *B41F 5/04* (2013.01); *B41F 5/24* (2013.01); *B41F 11/02* (2013.01);
(Continued)

(58) Field of Classification Search
None
See application file for complete search history.

(56) References Cited

U.S. PATENT DOCUMENTS 4,420,502 A   12/1983   Conley
4,427,732 A   1/1984    Gray, III et al.
(Continued)

FOREIGN PATENT DOCUMENTS

DE   4132476 A1   4/1993
EP   0 059 056 A1   9/1982
(Continued)

OTHER PUBLICATIONS

Mar. 25, 2015 Search Report issued in British Patent Application No. 1417025.2.
(Continued)

*Primary Examiner* — Shamim Ahmed
*Assistant Examiner* — Bradford M Gates
(74) *Attorney, Agent, or Firm* — Oliff PLC

(57) ABSTRACT

A method of manufacturing a pattern on a substrate web includes providing a production tool having a surface relief structure of elevations and depressions. The elevations correspond to a desired pattern. A curable material is applied to the elevations. The material is brought into contact with a substrate web at a first location. The substrate web and surface relief structure are transported together in contact from the first location to a second location spaced from one another along the transport direction of the substrate web. The substrate web is separated from the surface relief structure at the second location whereupon the material forming the pattern is affixed to and carried by the substrate web. The material is cured by exposure to a curing energy source, either between the first and second locations and/or
(Continued)

after the substrate web has been separated from the surface relief structure at the second location.

29 Claims, 6 Drawing Sheets

(51) Int. Cl.

| | | |
|---|---|---|
| *B41M 1/04* | (2006.01) | |
| *B41F 5/04* | (2006.01) | |
| *B41F 5/24* | (2006.01) | |
| *B41M 3/14* | (2006.01) | |
| *B41F 11/02* | (2006.01) | |
| *B41F 23/04* | (2006.01) | |
| *B42D 25/40* | (2014.01) | |
| *B42D 25/29* | (2014.01) | |
| *B42D 25/00* | (2014.01) | |
| *B42D 25/378* | (2014.01) | |
| *C09D 11/037* | (2014.01) | |
| *C09D 11/101* | (2014.01) | |
| *B44F 1/10* | (2006.01) | |
| *B41M 7/00* | (2006.01) | |

(52) U.S. Cl.
CPC ...... *B41F 23/0406* (2013.01); *B41F 23/0409* (2013.01); *B41M 1/02* (2013.01); *B41M 1/04* (2013.01); *B41M 3/14* (2013.01); *B42D 25/00* (2014.10); *B42D 25/29* (2014.10); *B42D 25/378* (2014.10); *B42D 25/40* (2014.10); *B44F 1/10* (2013.01); *C09D 11/037* (2013.01); *C09D 11/101* (2013.01); *B41M 7/009* (2013.01); *B41M 7/0081* (2013.01)

(56) References Cited

U.S. PATENT DOCUMENTS

| | | | | |
|---|---|---|---|---|
| 6,143,145 | A | * 11/2000 | Copping | B41F 5/24 204/206 |
| 6,440,277 | B1 | 8/2002 | D'Amato | |
| 2006/0275625 | A1 | * 12/2006 | Lieberman | B41F 5/22 428/697 |
| 2008/0259400 | A1 | * 10/2008 | Hersch | B41M 3/144 358/2.1 |
| 2009/0135239 | A1 | * 5/2009 | Chretien | B41F 23/0409 347/102 |
| 2011/0249047 | A1 | * 10/2011 | De Joseph | B41M 1/06 347/2 |

FOREIGN PATENT DOCUMENTS

| | | |
|---|---|---|
| EP | 0338378 A2 | 10/1989 |
| EP | 1 514 680 A1 | 3/2005 |
| JP | H01-307789 A | 12/1989 |
| JP | 2000-511835 A | 9/2000 |
| JP | 2001-162774 A | 6/2001 |
| JP | 2004-123802 A | 4/2004 |
| JP | 2005-153445 A | 6/2005 |
| JP | 2010-210767 A | 9/2010 |
| WO | 97/46388 A1 | 12/1997 |
| WO | 2005/052650 A2 | 6/2005 |
| WO | 2006/132919 A2 | 12/2006 |
| WO | 2008/000350 A1 | 1/2008 |
| WO | 2008/060864 A1 | 5/2008 |
| WO | 2011/102800 A1 | 8/2011 |
| WO | 2011/107788 A1 | 9/2011 |
| WO | 2012/176126 A1 | 12/2012 |
| WO | 2013/054117 A1 | 4/2013 |

OTHER PUBLICATIONS

Mar. 26, 2014 Search Report issued in British Patent Application No. 1317195.4.

Jan. 27, 2015 Written Opinion issued in International Patent Application No. PCT/GB2014/052914.

Jan. 27, 2015 Search Report issued in International Patent Application No. PCT/GB2014/052914.

Aug. 29, 2018 Office Action issued in Japanese Patent Application No. 2016-517304.

* cited by examiner

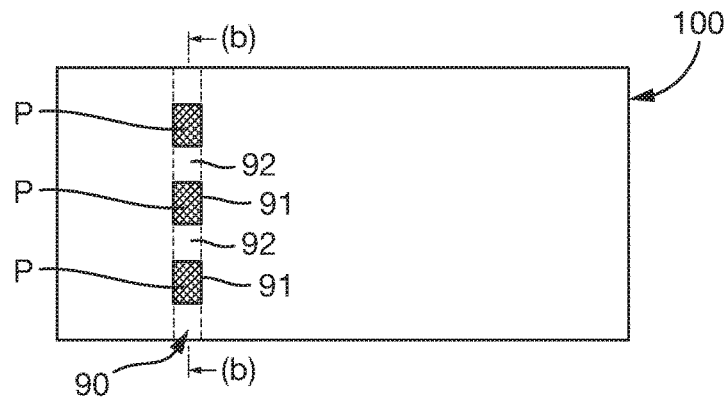
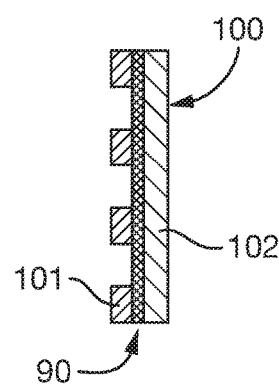
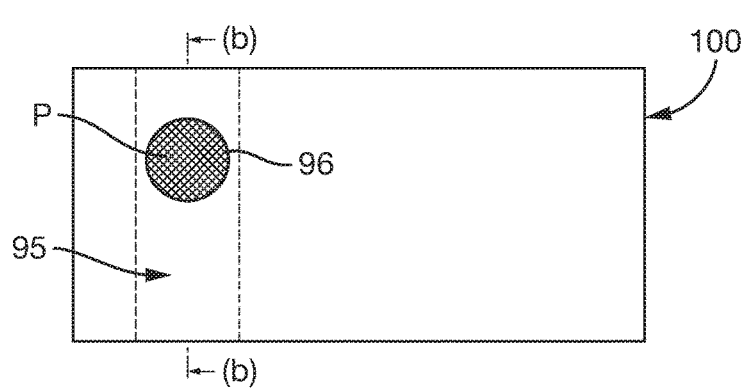
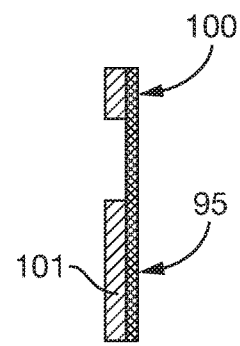
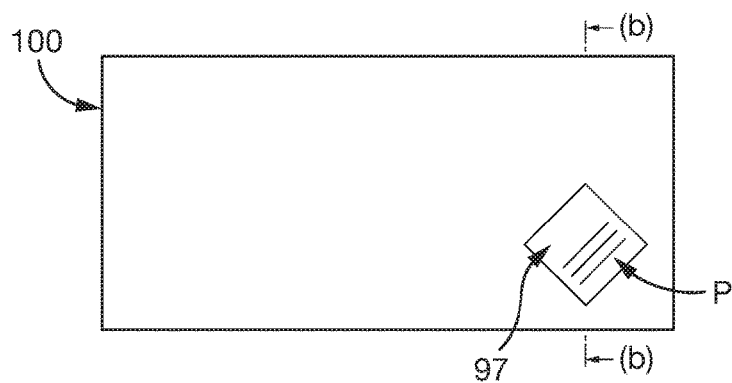
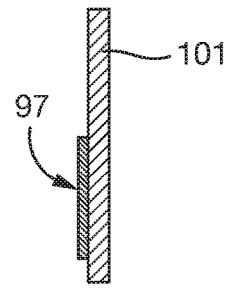

METHOD OF MANUFACTURING PATTERN AND APPARATUS THEREFOR

This invention relates to methods of manufacturing patterns suitable for use, for example, in security devices of the sort used to verify the authenticity of documents of value such as banknotes and the like. Articles incorporating such patterns and apparatus for performing the methods are also provided.

Objects of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. Examples include printed features, such as microtext, fine line patterns and latent images where the security effect can be exhibited by a single layer of pattern elements; as well as more complex structures such as venetian blind devices, lenticular devices, moiré interference devices and moiré magnification devices, where interaction between two or more layers produces the secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

There is a constant need to improve the security level of security devices to stay ahead of potential counterfeiters. In order for a security device to be most effective, it must be readily distinguishable from copies or imitations and in the case of a visible security device this requires the device to exhibit a distinctive visual effect which is easily tested. Many of the known types of security device mentioned above depend for this effect upon the high resolution with which pattern elements of the device have been produced. For instance, microtext and fine line features rely on their elements having a higher resolution than is achievable using printing techniques available to would-be counterfeiters.

Further, the varying appearance of latent images, venetian blind devices, lenticular devices, moiré interference devices and moiré magnification devices at different angles of view depend at least in part upon the closeness with which the pattern elements comprised in the device can be laterally placed.

Typical printing processes used to manufacture pattern elements for security devices include intaglio, gravure, flexographic, wet lithographic printing and dry lithographic printing. WO-A-2011/107788 discloses some examples of known printing processes. The achievable resolution is limited by several factors, including the viscosity, wettability and chemistry of the ink, as well as the surface energy, unevenness and wicking ability of the substrate, all of which lead to ink spreading. With careful design and implementation, such techniques can be used to print pattern elements with a line width of between 25 µm and 50 µm. For example, with gravure or wet lithographic printing it is possible to achieve line widths down to about 15 µm. However, consistent results at this resolution are difficult to achieve and in any case this level of resolution still imposes a significant limitation on the security device. Higher resolution elements (i.e. smaller line widths) would be highly desirable.

One approach which has been put forward as an alternative to the printing techniques mentioned above is used in the so-called Unison Motion™ product by Nanoventions Holdings LLC, as mentioned for example in WO-A-2005052650. This involves creating pattern elements ("icon elements") as recesses in a substrate surface before spreading ink over the surface and then scraping off excess ink with a doctor blade. The resulting inked recesses can be produced with line widths of the order of 2 µm to 3 µm. This high resolution produces a very good visual effect, but the process is complex and expensive. Further, limits are placed on the minimum substrate thickness by the requirement to carry recesses in its surface.

WO-A-2008/000350 and WO-A-2011/102800 disclose techniques in which a pattern of recesses is formed in a mould which is then filled with a curable ink and applied to a carrier. The ink is cured and attaches to the carrier. However, the cured ink is prone to damage upon removal from the mould recesses and as such the pattern may not be perfectly reproduced.

The present invention provides a method of manufacturing a pattern on a substrate web, comprising:
  providing a production tool having a surface relief structure of elevations and depressions, the elevations corresponding to the desired pattern to be applied to the substrate web;
  applying a curable material to the elevations of the surface relief structure on the production tool;
  bringing the applied curable material on the surface relief structure into contact with a substrate web at a first location;
  transporting the substrate web and surface relief structure together in contact from the first location to a second location, the first and second locations being spaced from one another along the transport direction of the substrate web;
  separating the substrate web from the surface relief structure at the second location whereupon the curable material forming the pattern is affixed to and carried by the substrate web; and
  curing the curable material on the substrate web by exposure to at least one curing energy source, either while the substrate web and surface relief structure are in contact between the first and second locations and/or after the substrate web has been separated from the surface relief structure at the second location.

It should be noted that the terms "elevations" and "depressions" refer to the heights of the surface relief structure in such regions relative to one another, and not necessarily to the nominal plane of the production tool surface. Thus, for example, the "depressions" will be of lower height than the "elevations" but not necessarily lower than the original plane of the production tool surface. The surface of each elevation is preferably flat, i.e. of substantially constant height relative to the nominal plane of the production tool surface. For example, where the surface relief structure is arranged on a cylindrical surface, the surface of each elevation will be at a substantially constant radius from the centre of the cylinder.

By defining the pattern as the elevations (raised portions) of the surface relief structure on the production tool and transferring the curable material, such as an ink, from (only) the raised portions onto the substrate web, replication of the pattern is accurate since inadvertent retention of the curable material by the surface relief structure is reduced or eliminated as compared with previous techniques. In this respect the presently disclosed method can be considered a form of flexographic printing, hence the surface relief structure may also be referred to as a flexographic print relief. However known flexographic techniques suffer from poor resolution due to ink spreading as previously described. By utilising a curable material and arranging for extended contact between the substrate web and the surface relief structure carrying the curable material (as opposed to single-point contact), such spreading is substantially reduced and the resolution significantly improved. This is because the extended contact allows a longer period of time for the curable material to become affixed to the substrate web, which in turn makes sufficient transfer of the pattern possible without the need for significant pressure to be applied between the surface relief structure and the substrate web (as is required in conventional processes).

Reducing the need for high-pressure contact has been found by the present inventor to be highly beneficial since this reduces deformation of the surface relief structure during the transfer process, which can otherwise lead to an apparent increase in the size of the elevations and hence in the transferred pattern elements. For example, in conventional flexographic printing methods where the pattern is transferred to a substrate web in a nip between two opposition rollers which apply a pressure towards one another, the applied pressure can cause squashing and hence spreading of the surface relief structure, increasing the width of the printed elements by as much as a factor of two relative to the actual width of the elevations. By extending the period of time for which the substrate web is held in contact with the curable material on the surface relief structure, the present invention reduces the need for pressure to be applied and hence leads directly to an improvement in the resolution of the transferred pattern. For example, embodiments of the inventive method have achieved transferred pattern element dimensions with a gain of only 30% or less relative to the actual width of the elevations on the surface relief, and even down to a one-to-one relationship. The combination of low or zero pressure during transfer with an extended wrap contact (as opposed to single-point contact) has been found by the present inventors to produce particularly good results.

Curing of the curable material can take place in one step or in several steps (discrete or otherwise). In some particularly preferred implementations, curing is performed (only) once the substrate web has been separated from the surface relief structure, i.e. downstream of the second location. This is advantageous since this avoids inadvertently curing any material on the surface relief structure, e.g. which may have undesirably flowed into the depressions during inking, which would make it more difficult to remove.

In other preferred implementations, while the substrate web and surface relief structure are in contact between the first and second locations, the curable material is at least partially cured by exposure to a curing energy source such that when the substrate web is separated from the surface relief structure at the second location, the at least partially cured material forming the pattern is affixed to and carried by the substrate web. This improves the adhesion of the curable material to the substrate web and helps to fix the pattern in place before the substrate is removed from the surface relief, which risks smudging. The curing carried out during the extended wrap contact could be sufficient to completely cure the material such that no further curing step is needed, but more preferably does not achieve full curing. Hence a second curing step may preferably be performed after separation of the web from the surface relief to complete the curing. Thus, the method may further comprise re-exposing the at least partially cured material carried on the substrate web to a curing energy source after separation of the web from the surface relief structure to fully cure the material.

This may be performed by the same or a different curing energy source depending on the geometry.

It should be noted that when the curable material is applied to the surface relief structure, it is applied only onto the elevations (i.e. raised portions) of the relief and substantially not into the depressions.

Preferably, the surface relief structure is substantially a cylinder and the first and second locations are spaced points on its circumference, whereby the substrate web and surface relief structure are maintained in contact with one another (e.g. through web tension) as they are transported along a portion of the circumference of the cylinder with the cylinder rotation.

In particularly preferred embodiments, the portion of the circumference of the cylinder is at least an eighth of the full circumference of the cylinder, preferably at least a quarter of the full circumference of the cylinder, still preferably at least a third of the full circumference of the cylinder, most preferably at least half of the full circumference of the cylinder.

The surface relief structure can be formed for example in the surface of a roller or as a sleeve or sheet carried on a roller, such as a clamping roller.

In preferred examples, the first and second locations are spaced from one another along the transport direction of the substrate web by 50 mm to 350 mm, preferably 100 to 250 mm. Advantageously, the time of travel of any one point on the substrate web from the first location to the second location is between 0.2 seconds and 2 seconds (assuming web speeds in the range 10 mpm to 40 mpm), and more preferably 0.4 seconds to 1 second.

Preferably, the curable material is applied to the surface relief structure from a transfer roller assembly comprising one or more rollers. The transfer roller assembly may comprise a meter roller, preferably an anilox or gravure roller, which is adapted to transfer a curable material layer of predetermined thickness.

Typically such rollers have a cellular or screened surface structure, the depth and pitch of the cells being selected to carry the desired ink thickness. It is desirable that the cell dimensions on the anilox roller are smaller than the smallest dimensions of the flexographic print relief (surface relief structure) such the flexographic relief is always fully supported by the walls of the anilox cell or screen pattern, i.e. that each raised portion of the flexographic relief will be contacted by at least one cell wall (preferably multiple cell walls) so as to prevent immersion of the raised portions in the anilox cells. It is further desirable that the walls (or "land" areas) in the anilox cell pattern are also minimised for thickness to maximise the fill factor of the anilox cell pattern and that this wall dimension should also be significantly less than the smallest line width dimension in the flexographic print pattern. Preferably, the elevations on the surface relief (flexographic pattern) include elevations with a minimum dimension in the range 5 to 50 microns, preferably 5 to 30 microns, more preferably 10 to 20 microns. For example if the thinnest line width present on the flexo print pattern is around 40 microns then the cell pitch should be less than 40 microns (preferably at least a factor of 2 less) and the wall thickness or width between the cells should preferably much less than either (preferably at least a factor of 10 less). In practice the limits of current laser engraving and positioning for manufacturing the cell pattern are around 2 to 5 microns and this sets a practical minimum for wall line width.

The curable material may be transferred directly on to the surface relief structure from the meter roller but in a further embodiment, the transfer roller assembly further comprises an application roller, preferably an offset roller, between the meter roller and the surface relief structure, for transferring the curable material from the meter roller to the surface relief structure. Preferably, the surface of the application roller is smooth compared with the surface of the meter roller. This helps to prevent any structuring of the ink coating caused by the cellular surface of the meter roller from being replicated in the ink applied to the surface relief on the production tool. For instance, the surface of the application roller may be a smooth, hard polymeric material, a ceramic material or a non-corrosive polished metal surface. A hard material such as this is preferable for forming the surface of the application roller since the flexographic relief structure may typically be compressible and elastomeric, i.e. it returns to its original shape after leaving the nip. An example material for the flexographic roller is EPDM rubber (ethylene propylene diene monomer (M-class) rubber). As such the surface of the roller which contacts the compressible relief structure of the flexo-graphic roller should preferably be hard and essentially non-compliant in order to generate a sufficiently high contact or nip pressure to effect efficient ink transfer from the application roller to the flexo surface.

In still further embodiments, the transfer roller assembly may comprise an application roller and no meter roller. For example, the ink may be applied to the application roller from a sequence of inking rollers (such as may be used in lithographic systems) to transfer the ink from an ink tray to the application roller. In this case the sequence of rollers (which can preferably be moved laterally relative to each other) will act to meter down and homogenise the ink film transferred onto the flexo-cylinder.

The transfer roller assembly may include one or more wiping means, such as a doctor blade, a wiping cylinder, a "squeegee" and/or a cylinder system which rotates in a counter direction to the application roller, adapted to remove any excess curable material from one or more of the rollers forming the transfer roller assembly, preferably the meter roller and/or from the application roller. Where an application roller such as an offset cylinder is used to transfer ink onto the relief structure, a waste ink matrix may be left on the application roller after contact with the flexographic print cylinder (the inverse of the surface relief print pattern), and a wiping system is preferably provided to remove this waste ink. A cleaning system for keeping the wiping roller clean during the continuous web process is also preferably provided.

Additionally or alternatively, in particularly preferred embodiments the method further comprises cleaning the surface relief structure downstream of the second location to remove any excess curable material remaining after separation of the substrate web, preferably using a cleaning mechanism comprising a cleaning surface arranged to be brought into contact with the surface relief structure, the cleaning surface being softer than the surface relief structure. In preferred examples the cleaning mechanism comprises a cleaning roller, a cleaning web disposed about a support roller, a flexible blade or a squeegee. This is found to be of particular benefit where the dimensions of the pattern are small since the small volume of each depression can otherwise inadvertently become filled or "bridged" by excess curable material. By cleaning the surface relief structure after the substrate web has been separated from it (and before further curable material is applied), the build-up of excess curable material is reduced or eliminated, which allows the process to output a greater length of patterned substrate web before any detrimental effects affect the quality of the product. By utilising a cleaning surface which is softer than that of the surface relief, not only is any remaining ink removed from the raised regions, but also the cleaning mechanism is able to contact and remove curable material which may be lying in the depressions of the structure. Suitable cleaning surfaces include soft rollers such as a lint-free fibre roller or a sponge roller, or a web made of such materials.

In particularly preferred embodiments, the application roller and cylinder formed by the surface relief structure rotate in opposite rotational senses to one another so that the contact surfaces move in the same direction.

If a meter roller is used in the application of the ink to the print cylinder, its cellular surface may introduce a corresponding cellular pattern to the transferred ink which may be detrimental to the final result. In order to address this, in one preferred embodiment, the curable material is preferably applied to the application roller surface relief structure by the metering roller rotating at a different surface speed to the application roller. This has the result that, at the point of contact, whilst the application cylinder and metering cylindering are travelling in the same direction as one another, the difference in surface speed (which may only be slight) will have a shearing and spreading effect on the ink thus homogenising the coat weight and reducing any patterning due to the cell structure of the metering cylinder. It is envisaged that the difference in surface speed between the application roller and the metering roller should preferably not exceed 40% and is preferably less than 30%. Most preferably the metering roller is rotated more slowly than the application roller, but in other cases the application roller may be the faster.

Additionally or alternatively, the averaging or homogenising effect may be achieved or further enhanced by allowing the metering roller and application roller to oscillate relative to one another in a direction traverse to the web direction (i.e. along their axial direction), thus providing lateral smearing of the ink pattern transferred onto the application roller. Preferably the metering roller is able to oscillate transversely whilst the application roller is not, but in other cases the reverse could be true or both could be capable of oscillation.

Any suitable curable material could be used, such as a thermally-curable resin or lacquer. However, preferably, the curable material is a radiation curable material, preferably a UV curable material, and the curing energy source is a radiation source, preferably a UV source. UV curable polymers employing free radical or cationic UV polymerisation are suitable for use as the UV curable material. Examples of free radical systems include photo-crosslinkable acrylate-methacrylate or aromatic vinyl oligomeric resins. Examples of cationic systems include cycloaliphatic epoxides. Hybrid polymer systems can also be employed combining both free radical and cationic UV polymerization. Electron beam curable materials would also be appropriate for use in the presently disclosed methods. Electron beam formulations are similar to UV free radical systems but do not require the presence of free radicals to initiate the curing process. Instead the curing process is initiated by high energy electrons. An exemplary suitable UV curable flexographic ink for use in the presently disclosed methods would be Flexocure Force™ from Flint Group. An exemplary suitable electron beam curable ink would be Photoflex II™ from the Wikoff Color Corporation.

Advantageously, the curable material is of high viscosity so as to reduce or prevent flow of the material into the depressions of the relief structure, and to minimise spreading of the transferred pattern elements. In preferred embodiments, in its uncured state, the curable material has a viscosity in the range 0.1 to 5 Pa·s at 23 degrees C., more preferably 0.4 to 2 Pa·s and still preferably 0.6 to 1.2 Pa·s.

Preferably the finished pattern is visible (optionally after magnification) to the human eye and so advantageously the curable material comprises at least one colourant which is visible under illumination within the visible spectrum. For instance, the material may be carry a coloured tint or may be opaque. Additionally or alternatively, the curable material may comprise at least one substance which is not visible under illumination within the visible spectrum and emits in the visible spectrum under non-visible illumination, preferably UV or IR. In preferred examples, the curable material comprises any of: luminescent, phosphorescent, fluorescent, magnetic, thermochromic, photochromic, iridescent, metallic, optically variable or pearlescent pigments. In preferred examples, the curable material has an optical density greater than or equal to 0.1, more preferably greater than or equal to 0.25 and still preferably greater than or equal to 0.5 (optical density is a dimensionless ratio). The optical density values given refer to optical density when measured on a transmission densitometer, with an aperture area equivalent to that of a circle with a 1 mm diameter. A suitable transmission densitometer is the MacBeth TD932.

Various different arrangements of the processing apparatus could be employed. However in preferred embodiments, the substrate web is arranged below the surface relief structure with respect to gravity, at least where the substrate web and the surface relief structure are in contact with one another. This arrangement is preferred since, during the extended wrap contact, the effect of gravity will be to encourage transfer of the curable material onto the substrate web, and not flow of the curable material into the depressions of the relief structure.

Preferably, the substrate web comprises a film which allows transmission of the curing energy therethrough, preferably a UV-transparent film. This permits the material to be cured through the substrate web. However this is not essential since the surface relief structure may be transparent to the curing energy in which case the material can be cured through the surface relief.

The invention further provides an article comprising a substrate and a pattern formed on the substrate in accordance with the above method, preferably a security article.

The article may comprise other features which co-operate with the so-produced pattern to produce a visual effect, preferably an optically variable effect (i.e. one which has different appearances at different viewing angles). For example, the article may further comprise an array of focussing elements, preferably lenses or mirrors, configured for viewing of the pattern therethrough.

In one such preferred embodiment, the article may comprise a moiré magnification type device. Thus, preferably, the pattern comprises an array of substantially identical microimages, and the pitches of the array of focusing elements and the array of microimages and their relative locations are such that the array of focusing elements cooperates with the array of microimages to generate magnified version of the microimages due to the moiré effect.

In another preferred embodiment, the article may comprise a lenticular type device. This, preferably, the pattern comprises an array of image elements, each image element representing a portion of an image, image elements from at least two different images being interleaved across the array whereby a different one of the at least two different images is directed to the viewer by the array of focusing elements depending on the viewing angle.

Many other types of security device could be made using the above described technique for producing pattern elements of the device. Further examples of such devices are described in WO-A-2013/054117.

In some preferred embodiments the article may be a security element, preferably a thread, strip, foil or patch, suitable for application to or incorporation in a security document for instance. Alternatively the article may be a security document, preferably a banknote, identification card, drivers licence, passport or certificate, with the substrate forming an integral part of the document.

The invention further provides an apparatus for manufacturing a pattern on a substrate web, comprising:
  a production tool having a surface relief structure of elevations and depressions, the elevations corresponding to the desired pattern to be applied to the substrate web
  a transfer assembly adapted to apply a curable material to the elevations of the surface relief structure on the production tool;
  a transport assembly configured to:
    bring the applied curable material on the surface relief structure into contact with a substrate web at a first location;
    transport the substrate web and surface relief structure together in contact from the first location to a second location, the first and second locations being spaced from one another along the transport direction of the substrate web whereupon the curable material forming the pattern is affixed to and carried by the substrate web; and
    separate the substrate web from the surface relief structure at the second location; and
  at least one curing energy source adapted to expose the curable material to curing energy either while the substrate web and surface relief structure are in contact between the first and second locations and/or after the substrate web has been separated from the surface relief structure at the second location.

The apparatus can be adapted to include means for carrying out the method described above and any of its preferred features.

As mentioned above, the at least one curing energy source may be located downstream of the second location such that all curing takes place after separation of the substrate web and the surface relief structure. In other preferred embodiments, the at least one curing energy source comprises a curing energy source adapted to expose the curable material to curing energy while the substrate web and surface relief structure are in contact between the first and second locations, such that when the substrate web is separated from the surface relief structure at the second location, the at least partially cured material forming the pattern is affixed to and carried by the substrate web. This curing energy source may be configured to completely cure the transferred pattern but preferably only partial curing is achieved during the extended wrap and curing is completed after the second location. This may be achieved using two separate energy sources or a single energy source arranged in the vicinity of the second location.

Examples of methods for manufacturing patterns and apparatus therefor will now be described with reference to the accompanying drawings, in which.

Figure 4:
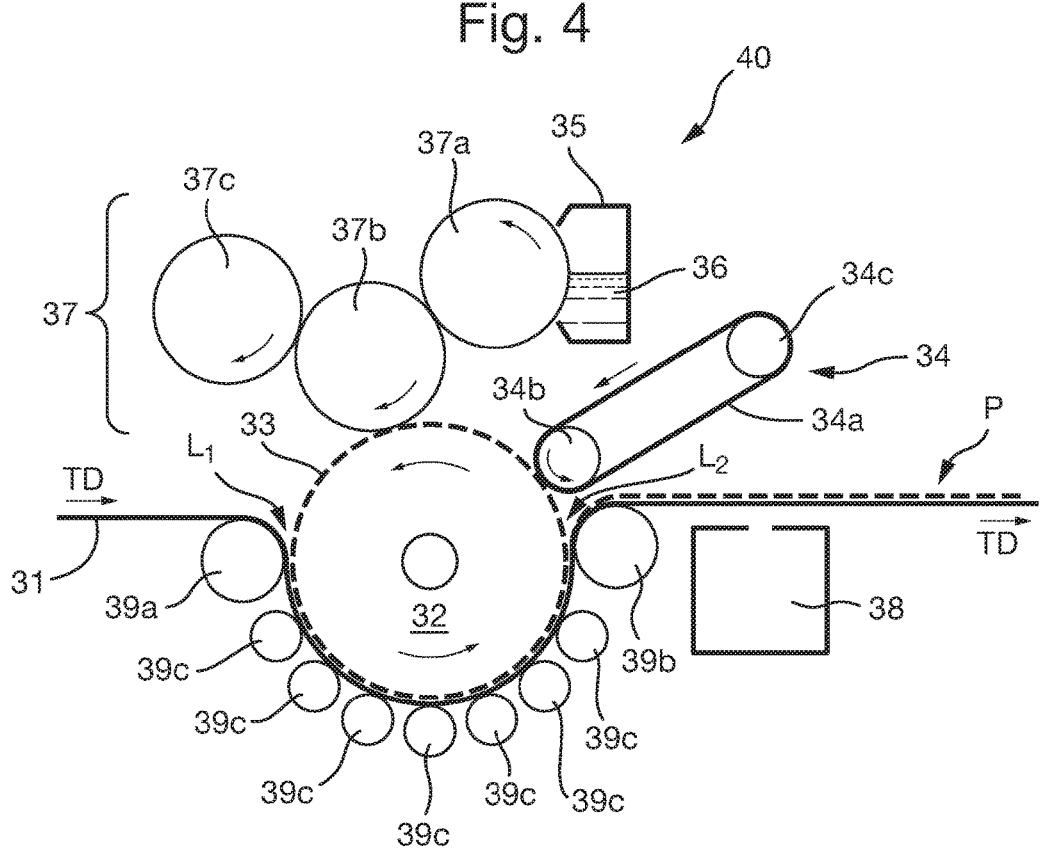
Figure 5:
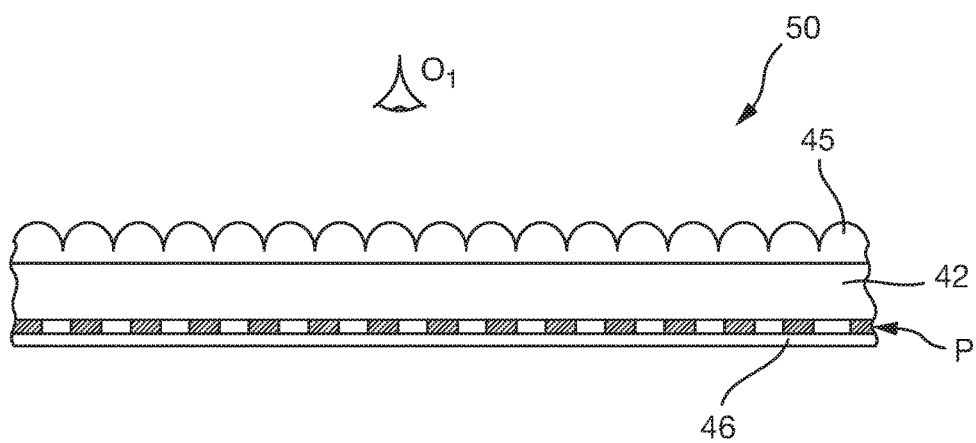

FIG. 4 depicts exemplary apparatus for performing a method of manufacturing a pattern on a substrate web in accordance with a fourth embodiment FIG. 5 shows a cross-section through an embodiment of a security article comprising a pattern on a substrate manufactured in accordance with an embodiment of the invention; and FIGS. 6 to 8 show three exemplary security documents comprising security articles in accordance with embodiments of the invention.

Figure 1A:
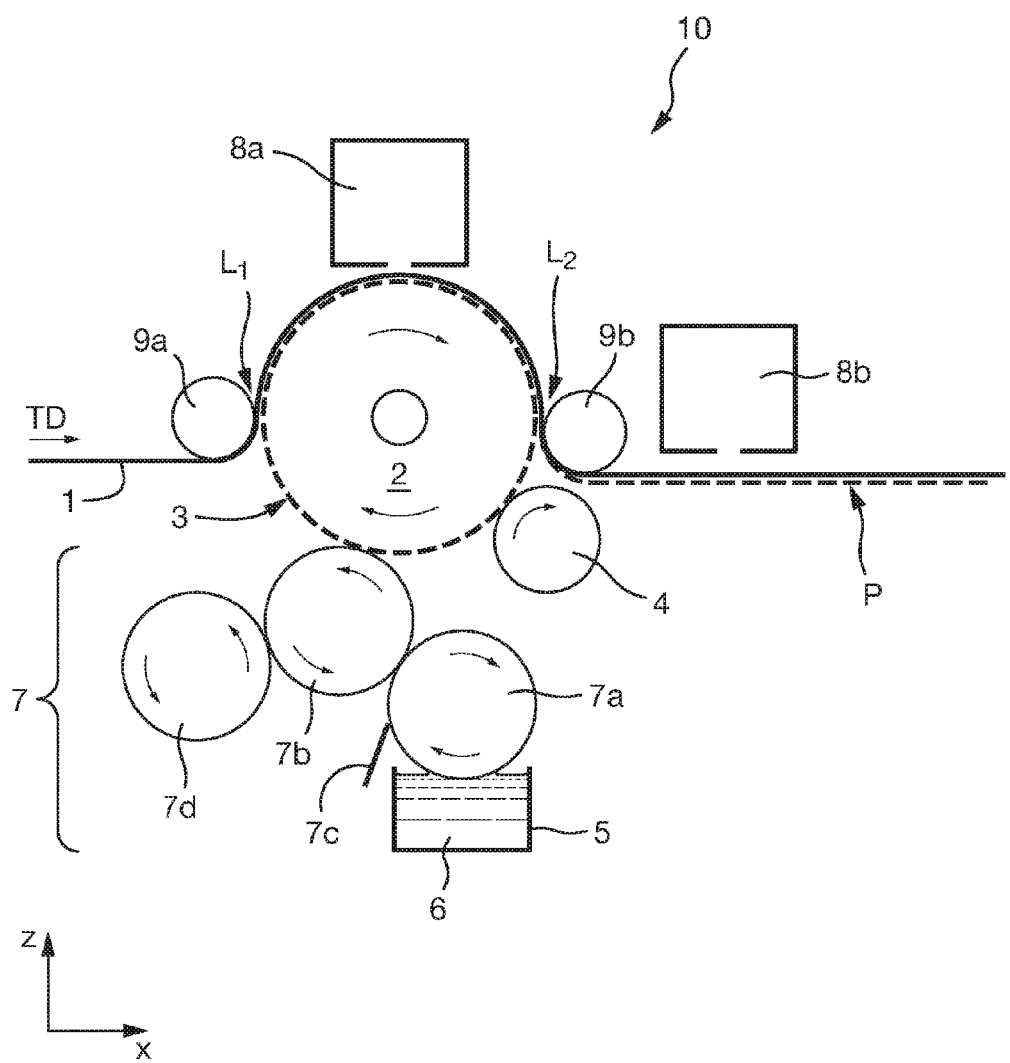
FIG. 1a depicts exemplary apparatus for performing a method of manufacturing a pattern on a substrate web in accordance with a first embodiment.

FIG. 1a shows a first preferred embodiment of a method and apparatus 10 for manufacturing a pattern P on a substrate web 1. The substrate web 1 may comprise for example a polymer film such as polypropylene (e.g. BOPP) and is preferably substantially transparent both to light in the visible spectrum and to UV. The substrate web 1 is transported along a transport direction TD by a transport mechanism (not fully shown) which includes support rollers 9a and 9b. The substrate web passes around a print cylinder 2 and is held under tension against the print cylinder 2 by rollers 9a and 9b. In this example the rollers 9a and 9b are "lay-over" rollers. Each roller 9a, 9b places weight on the substrate web acting vertically downwards (i.e. in the negative z-axis direction), away from the centre of print cylinder 2. Thus no pressure (or only a low pressure) is applied to the substrate web 1 between the respective roller and the print cylinder 2. The tension of the web 1 is preferably in the range 10 to 100 N, more preferably 25 to 50 N.

The print cylinder 2 is a production tool carrying about its circumference a surface relief structure 3 formed of raised portions (elevations) and depressions which are not visible in FIG. 1. The surface relief structure follows the surface of the print cylinder and is thus itself substantially cylindrical (i.e. the relief structure is arranged on a cylindrical plane, although the relief defining the characters/pattern to be printed will of course depart from that plane). The relief structure may be an integral part of the print roller or could be formed as a separable plate or sleeve which is attached to a plain roller in use. This latter option enables the relief structure to be replaced as necessary with relative ease. The raised portions of the relief structure 3 correspond to the desired pattern P which is to be formed on the substrate web 1. Each raised portion is preferably substantially flat.

A curable material 6 such as an ink is applied to the surface relief structure 3 from a reservoir 5 by an application means 7 which in this case comprises a transfer roller assembly. This includes a meter roller 7a such as an anilox roller which takes ink from the reservoir 5. The surface of the meter roller is structured, e.g. with a cellular pattern, such that a desired ink thickness is coated onto the roller surface. A wiping means 7c such as a doctor blade may be provided to remove any excess ink.

The ink is transferred from the meter roller 7a onto an application roller 7b such as an offset roller. The application roller 7b preferably has a smoother surface than that of the meter roller such that any patterning of the ink caused by the structure of the meter roller surface is reduced before transfer to the print cylinder. This is particularly preferred since the dimensions of the surface relief structure 3 may be of the same order or even smaller than those of the cellular surface of the meter roller 7a. For example, the cell dimensions of a fine anilox roller may typically be around 20 microns, while the dimensions (e.g. line thickness) of the surface relief pattern may be in the range 1 to 50 microns and preferably 5 to 30 microns.

The application roller 7b applies the ink 6 to the raised portions (only) of the surface relief structure 3. This is achieved as is known in flexographic printing through selection of the properties of the ink and of the pressure applied between the rollers. Suitable UV curing flexographic inks may have viscosities at 23 degrees C. in the region of 0.1 to 5 Pa·s for example. An exemplary suitable UV curable flexographic ink for use in the presently disclosed methods would be Flexocure Force™ from Flint Group. A wiping roller 7d may also be provided for removing and/or spreading ink left on the application roller 7b after the ink has been transferred onto the raised portions of the surface relief structure. The wiping roller 7b is arranged in contact with the application roller 7b and preferably the wiping roller 7d rotates in the same sense as the application roller 7b. Alternatively a squeegee system might be utilised.

It should be noted that the ink application means 7 shown in FIG. 1 is exemplary and many other configurations could be utilised including a single inking roller arranged to transfer ink from the reservoir directly on to the surface relief 3.

Rotation of the print cylinder 2 brings the ink-coated relief structure 3 into contact with the web 1 at location $L_1$ formed by the nip between roller 9a and print cylinder 2. The inked regions contact the web 1 and in this configuration as the web is transported along the circumference of the print cylinder, the ink is optionally exposed to a curing energy source 8a, such as a UV radiation source or heat source, depending on the type of ink in use. If curing energy source 8a is provided, the ink is at least partially cured, and may be fully cured, in this configuration. At location $L_2$, which is spaced about the periphery of the cylinder 2 from location $L_1$ by a non-zero distance, roller 9b causes the web 1 to separate from the print roller. The at least partially cured ink also separates from the surface relief 3 and pattern P is carried on web 1.

Alternatively or in addition, a second curing station 8b may be provided to fully cure the ink on web 1 after separation from the print cylinder 2. Alternatively, both curing steps could be performed by a single curing energy source, disposed for example in roller 9b such that the web is irradiated both on and off the print cylinder.

Optionally but preferably, a cleaning mechanism 4 may be provided which is arranged to remove any ink which remains on the relief structure 3 after separation of the substrate web at position $L_2$. The cleaning mechanism 4 could comprise for example a roller configured to contact the surface relief structure with a surface which is preferably softer than the surface relief structure such that the cleaning surface will deform into the depressions, thereby contacting and removing any ink held therein. The roller surface could for example be formed of fibre or sponge. In other examples the cleaning mechanism 4 could comprise a cleaning web (described further below with reference to FIG. 4), or a blade or squeegee.

In the FIG. 1a example, the web 1 is held in contact with the print cylinder along approximately half of its full circumference. This is desirable to extend the period of time for which the ink can be cured onto the web 1 before release from the relief structure 3, which reduces the possibility of ink spreading or smudging.

However, provided the web is held in contact with the print cylinder for a finite distance (and not, for example at a single point defined by a nip between rollers), a longer or shorter finite distance may be appropriate. In preferred examples the web 1 is held in contact with the print cylinder 3 along at least one eighth of its full circumference, preferably at least along one quarter, more preferably at least along one third, most preferably at least along half of the cylinder circumference but in practice the distance (and hence the duration) depends on the cylinder dimensions as well as the transport speed.

In preferred examples, the first and second locations are spaced from one another along the transport direction of the substrate web by 50 mm to 350 mm, preferably 100 to 250 mm. Advantageously, the time of travel of any one point on the substrate web from the first location to the second location is between 0.2 seconds and 2 seconds (assuming web speeds in the range 10 mpm to 40 mpm), and more preferably 0.4 seconds to 1 second.

Figure 1B:
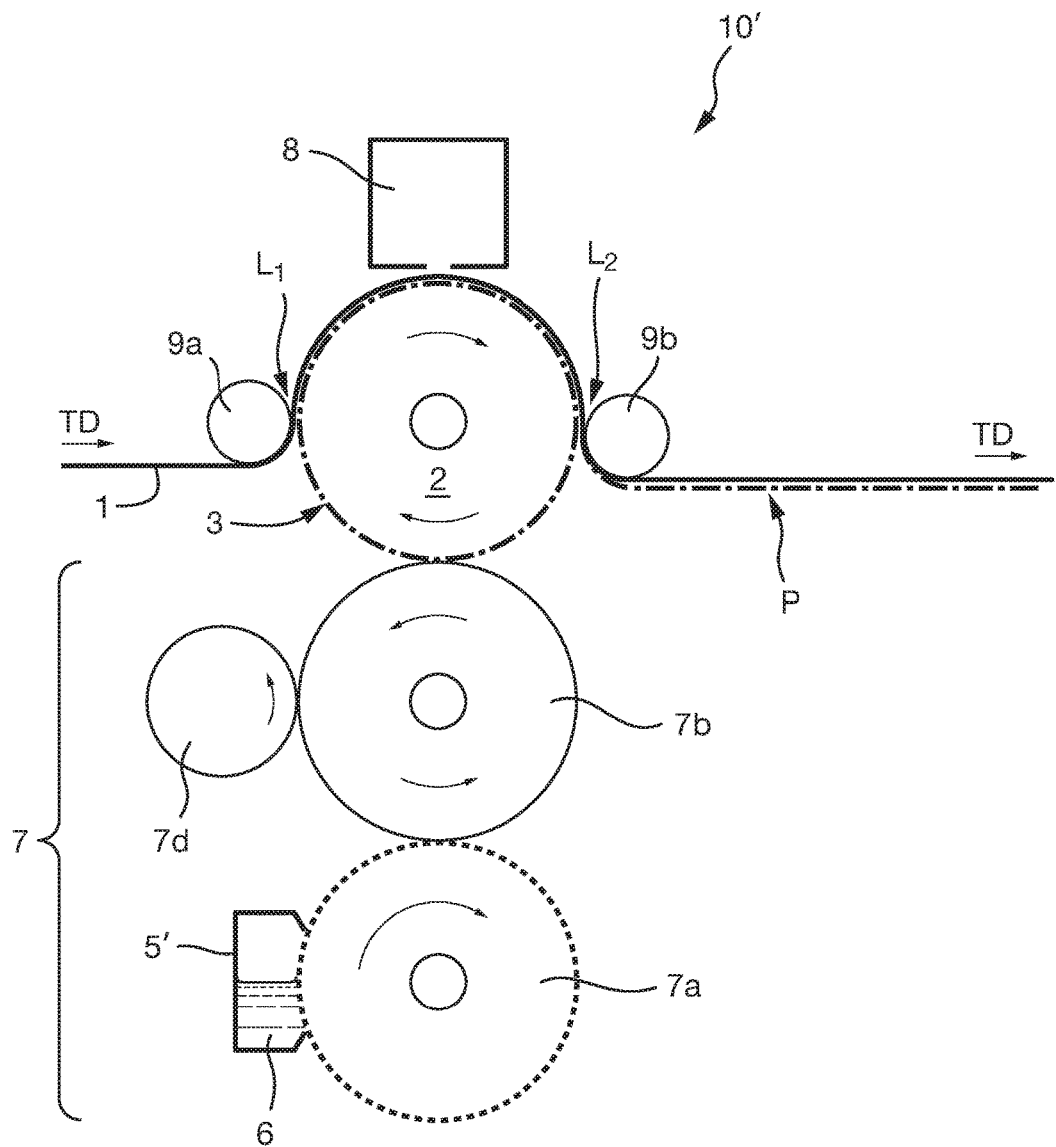
FIG. 1b depicts exemplary apparatus for performing a method of manufacturing a pattern on a substrate web in accordance with a variant of the first embodiment.

FIG. 1*b* shows a variant of the apparatus of FIG. 1*a*, in which like components are labelled with the same reference numerals as before. In this case, the ink application means 7 again comprises a meter (e.g. anilox or gravure) roller 7*a*, an application roller 7*b* and a wiping roller 7*c*. However, the meter roller 7*a* receives ink 16 from a doctor chamber box 5', which itself removes excess ink from the surface of the meter roller 7*a*.

In all embodiments, it is preferable that the cell dimensions on the meter roller (such as anilox roller 7*a*) are smaller than the smallest dimensions of the surface relief structure 3 on cylinder 2, such that the flexo relief is always fully supported by the walls of the anilox cell or screen pattern. It is further desirable that the walls or land areas between cells in the anilox cell pattern on meter roller 7*a* are also minimised for thickness to maximise the fill factor of the anilox cell pattern and that this wall dimension should also be significantly less than the smallest line width dimension in the flexo print pattern (relief 3). For example if the thinnest line width present on the flexo print pattern (relief 3) is around example 40 microns then the cell pitch on meter roller 7*a* should be less than 40 microns (preferably at least a factor of 2 less) and the wall thickness or width should preferably much less than either (ideally at least a factor of 10 less). In practice the limits of current laser engraving and positioning are around 2 to 5 microns and this sets the practical minimum for wall line width. It is also desirable to orientate the cellular pattern direction on meter roller 7*a* such that it does not align with key directions in the flexographic print relief pattern 3. For example, if the flexographic print structure 3 defines line patterns transverse to the web transport direction TD, then it is preferable for the meter roller 7*a* to have cells lying parallel to the machine direction TD or a linear arrangement of cells lying in the same direction, which will be perpendicular to the line pattern in the flexographic print structure. This helps to minimise the impact of the cellular pattern in the finished print.

Another (additional or alternative) way to reduce the effect of the cellular pattern on meter roller 7*a*, which can be applied to all embodiments, is to arrange the surfaces of meter roller 7*a* and application roller 7*b* to rotate at different speeds from one another. This has the result that, at the point of contact, the difference in surface speed (which may only be slight) will have a shearing and spreading effect on the ink thus homogenising the coat weight and reducing any patterning due to the cell structure of the metering cylinder. It is envisaged that the difference in surface speed between the application roller 7*b* and the metering roller 7*a* should preferably not exceed 40% and is preferably less than 30%. Preferably the metering roller 7*a* is rotated more slowly than the application roller 7*b* but the reverse could be true. In other embodiments, one or more different pairs of the rollers could be rotated at different relative speeds, e.g. the application roller 7*b* and the print cylinder 2, but it is preferred to apply a speed differential between the meter roller and the application roller. It will be appreciated that the term "surface speed" refers to the speed at which the outer surface of the respective roller is moving, i.e. surface speed=radius× angular velocity. Thus the two rollers may have the same angular velocity (or rotational frequency), but yet have different surface speeds if they are of different radii.

Additionally or alternatively, the averaging or homogenising effect may be achieved or further enhanced by allowing the metering roller 7*a* and application roller 7*b* to oscillate relative to one another in a direction traverse to the web direction TD (i.e. along the axial direction of the rollers, which will be parallel), thus providing lateral smearing of the cellular ink pattern transferred onto the application roller 7*b*. Preferably the metering roller 7*a* is able to oscillate transversely whilst the application roller 7*a* is not, but in other cases the reverse could be true or both could be capable of oscillation. Again this can be applied to any embodiment.

Figure 2:
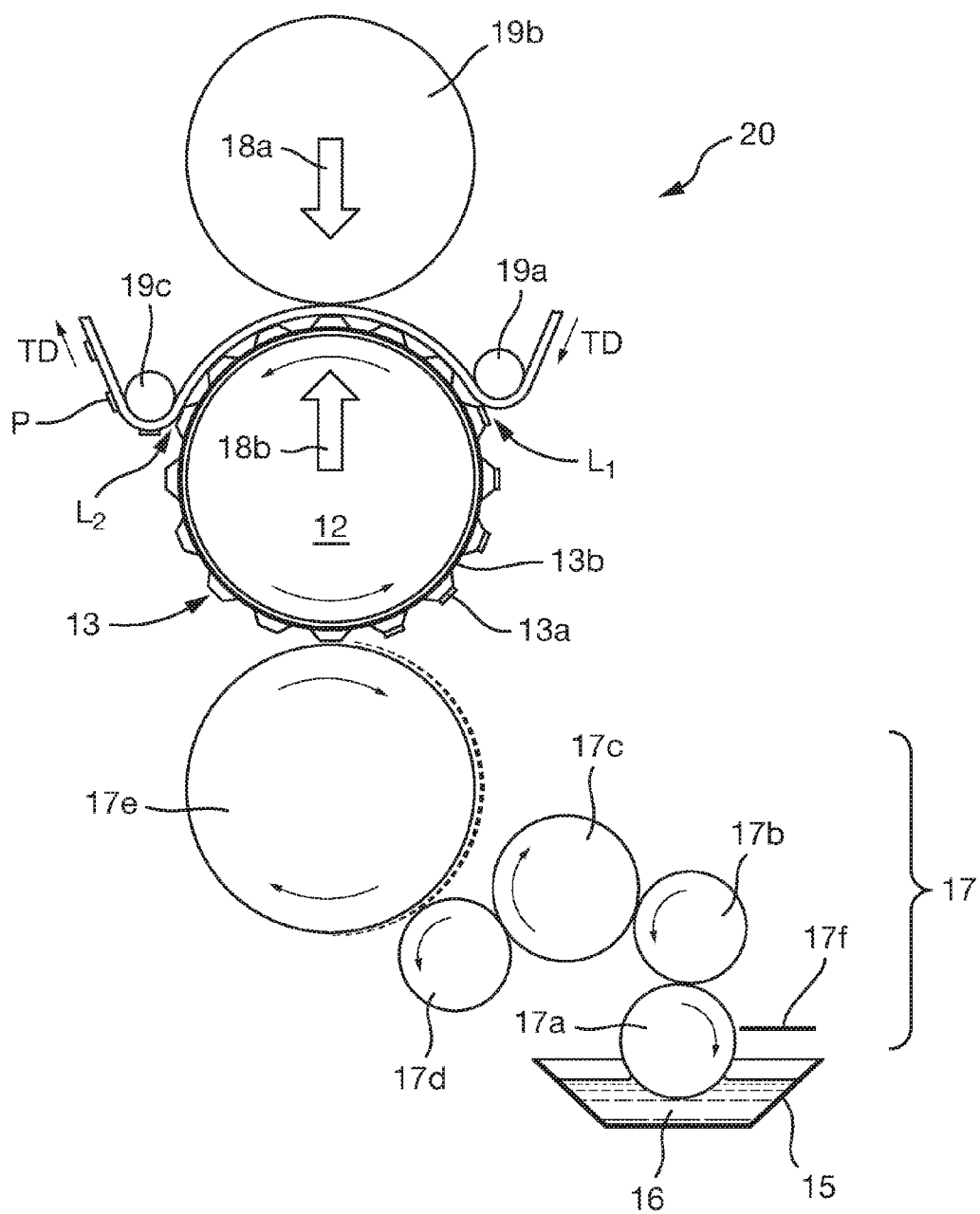
FIG. 2 depicts exemplary apparatus for performing a method of manufacturing a pattern on a substrate web in accordance with a second embodiment.

FIG. 2 depicts a second embodiment of apparatus 20 operating on the same principles as that of FIGS. 1*a* and 1*b*. Here on the print cylinder 12, the elevations 13*a* and depressions 13*b* of the surface relief structure 13 can be more clearly seen. Ink 16 is transferred from reservoir 15 onto the relief structure 13 by transfer roller assembly 17 which here comprises a roll chain formed of rollers 17*a*, 17*b*, 17*c*, 17*d* and 17*e* which applies the ink directly to print cylinder 12. The roller 17*e* may be a meter roller such as an anilox roller, or may be a standard, untextured inking roller. A doctor blade 17*f* may be provided for removal of excess ink as before, although in practice this may be applied to the meter roller 17*e* rather than to the inking roller 17*a* as shown.

Where a meter roller is deployed as roller 17*e*, possible patterning of the ink caused by the cellular surface structure of meter roller 17*e* can be alleviated using any of the same techniques discussed with respect to FIGS. 1*a* and 1*b*.

Where roller 17*e* is an untextured inking roller, metering of the ink can be achieved by the nip gaps between the rollers 17*a*, 17*b*, 17*c*, 17*d* and 17*e* and the shearing action on the ink due to the ink rollers having a controlled relative surface velocity. This has the advantage of no cellular pattern being introduced to the ink being transferred onto the print cylinder. As such, no spreading action is required and so preferably the application roller 17*e* and the print cylinder 12 are arranged to rotate in opposite directions to one another (as in FIGS. 1*a* and 1*b*).

The elevations of the surface relief 13 are thus coated with ink and rotation of the print cylinder brings the coated relief into contact with web 11 at point $L_1$. The web is transported along the circumference of the print cylinder 12 to a second location $L_2$, during which the web remains in contact with the surface relief by virtue of rollers 19*a* and 19*b*. During this transport the web passes through a nip formed between print cylinder 12 and opposition roller 19*b* which applies pressure to the web and assists in the transfer of the ink onto the web. However, in preferred embodiments, this pressure is kept low, e.g. below 0.5 MPa and more preferably below 0.2 MPa and even more preferably below 0.1 MPa. The roller 19b is equipped with a UV (or other curing energy) source 18a such that the ink is partially cured as it passes through the nip. Additionally or alternatively a curing source 18b may be located inside the print cylinder 12.

The roller 19c then causes the web 11 to separate from the print cylinder 12 at point $L_2$ carrying with it the at least partially cured ink forming pattern P. A further curing step may be carried out if desired.

In this case, the web 2 is maintained in contact with the print cylinder along approximately one third of the cylinder's full circumference.

Figure 3:
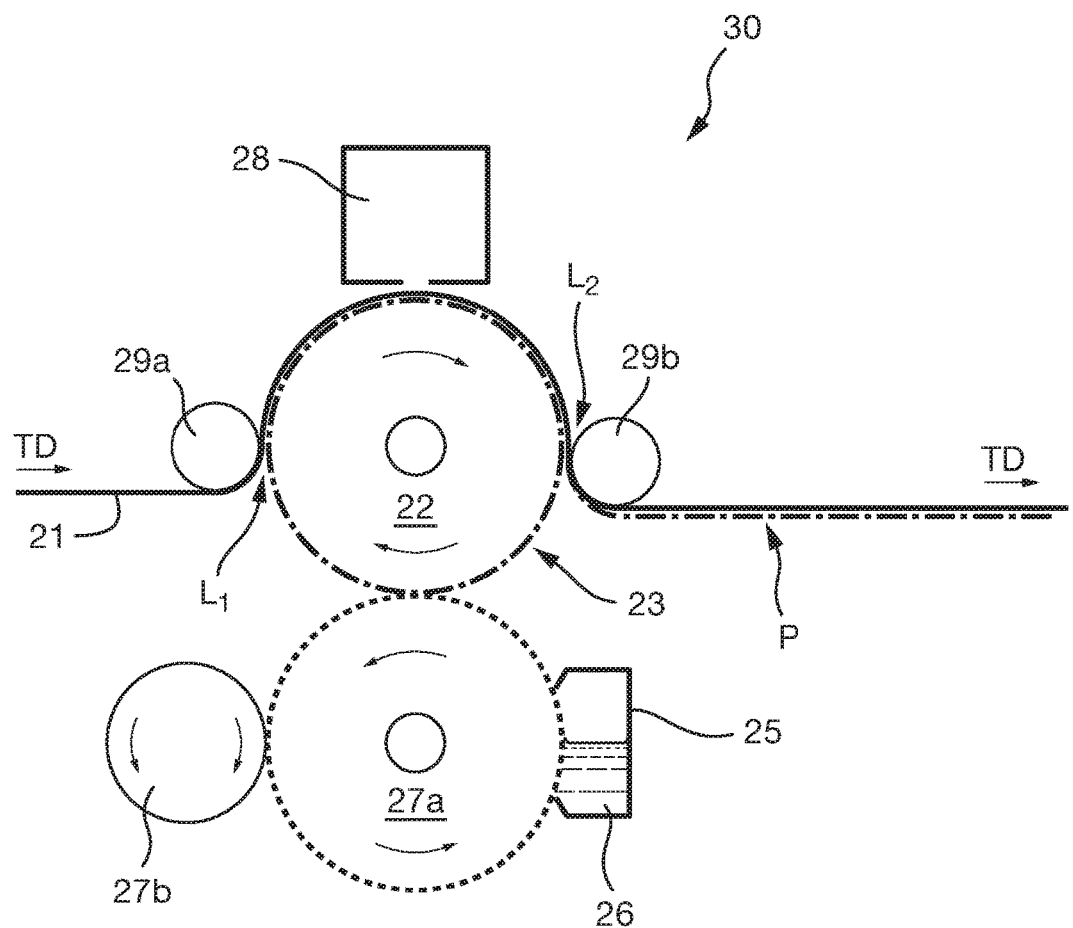
FIG. 3 depicts exemplary apparatus for performing a method of manufacturing a pattern on a substrate web in accordance with a third embodiment.

FIG. 3 depicts a third embodiment of apparatus 30 which operates on the same principles as the first and second embodiments. Here, the ink 26 is supplied directly onto an application roller 27a, which is itself a meter roller (e.g. anilox), from a chambered doctor blade 25. The chambered doctor blade 25 removes excess ink directly from the application/meter roller 27a so that a desired ink thickness is achieved. The ink is transferred onto the raised portions of the surface relief structure 23 carried on print cylinder 22 from the application/meter roller 27a and brought into contact with web 21 in the same way as before. The web is held in extended wrap contact with the print cylinder 22 by rollers 29a and 29b as before, and the ink is at least partially cured by radiation or heat source 28 during contact between locations $L_1$ and $L_2$ along the transport direction. The printed pattern P is thus transferred onto web 21. A wiping roller 27b removes left over ink from the surface of application/meter roller 27a.

To reduce the effect of the cellular pattern of meter roller 27a on the finished print, as described in relation to FIGS. 1a and 1b, it is preferable that the cell dimensions on the meter roller 27 are smaller than the smallest dimensions of the surface relief structure 23 on cylinder 22. It is further desirable that the walls or land areas between cells in the anilox cell pattern on meter roller 27 are also minimised for thickness to maximise the fill factor of the anilox cell pattern and that this wall dimension should also be significantly less than the smallest line width dimension in the flexo print pattern (relief 23). It is also desirable to orientate the cellular pattern direction on meter roller 27 such that it does not align with key directions in the flexographic print relief pattern 23.

FIG. 4 shows a fourth embodiment of apparatus 40 which operates on the same principles as the previous embodiments. Here, the substrate web 31 is arranged to pass under the print cylinder 32 (with respect to gravity). This is preferred since the orientation will encourage transfer of the ink onto the substrate web 31 rather than into the depressions of the surface relief 33. This preference applies to all embodiments, which can be rearranged accordingly. The transfer roller assembly 37 in this embodiment is substantially the same as that of the FIG. 1 embodiment except that it is now arranged above the print cylinder 32 and as such a doctored chamber blade 35 is used to supply meter roller 37a with ink. The ink is then transferred onto application roller 37b from which it is applied to the surface relief structure 33. Preferably a wiping roller 37c is also provided to remove excess ink from the application roller.

This embodiment also includes a cleaning mechanism 34 for removing excess ink from the surface relief structure after the substrate web 31 has been separated at position $L_2$. In this case, the cleaning mechanism 34 comprises a cleaning surface in the form of a web 34a which is disposed about two rollers 34b and 34c which transport the web across the surface of the relief structure 33. Preferably the cleaning web 34a is softer than the relief structure so as to remove ink from the depressions. A cleaning roller or blade could be utilised instead.

In this example, the support rollers 39a, 39b are lay-under rollers which support the substrate web 31 from underneath such that they apply a force vertically upwards, away from the centre of the print cylinder such that low or zero pressure is applied to the substrate web which is held against the relief structure by the web tension. Again this is preferably of the order of 25N. Optionally, one or more opposition rollers 39c could be arranged around the print cylinder 32 to assist in maintaining contact of the substrate web against the surface relief between the first and second positions. The pressure applied between each opposition roller 39c and the print cylinder 32 should preferably be zero, or less than 0.5 MPa, more preferably below 0.2 MPa and even more preferably below 0.1 MPa.

In this embodiment, curing of the ink takes place after separation of the substrate web 31 from the print cylinder 32, rather than during the extended contact. This can be advantageous since no curing of the ink on the cylinder will take place. A curing energy source 38 is disposed downstream of the second location $L_2$ for this purpose.

Patterns formed using the above described techniques can be formed with line widths as small as 5 to 50 microns (preferably 5 to 30 microns, more preferably 10 to 20 microns) and are thus well adapted for use in security devices such as moiré magnification devices and lenticular devices. As an example, FIG. 5 schematically illustrates a cross section through a security article 50, which here is a moiré magnifier. The article comprises a substrate 42 which corresponds to a portion of the substrate web previously described. Pattern P (formed as described above) comprises an array of identical microimages formed with a certain pitch and orientation. On the opposite surface of the substrate 42, an array of focusing elements such as lenses 45 is provided. The pitch and orientation of the lens array is such that moiré interference causes an observer $O_1$ to perceive a magnified version of the microimages. Optionally, a protective layer 46 may be applied over the pattern P to ensure robustness.

Many other types of security element can also be formed using the above described technique to form pattern elements thereof. For instance any of the security elements described in WO2013/054117 could be manufactured in this manner.

Security articles such as these incorporating the so-produced pattern could take the form of security elements such as security threads, labels, patches and the like. Alternatively the security article could comprise a security document such as a banknote with the substrate forming an integral part of the document (e.g. in the case of polymer banknotes or paper/polymer hybrid banknotes). Some examples of ways in which security articles can be incorporated into security articles are shown in FIGS. 6, 7 and 8:

FIG. 6 shows an embodiment of an object of value, here a document of value 100 such as a banknote, into which a security article 90 comprising inter alia a length of the patterned substrate web is incorporated. The substrate web may be cut into individual security threads 90 before insertion into the security document 100 but in preferred embodiments, a reel of the patterned substrate web 10 may be fed into a paper-making process, for example, to form a web of documents which is then cut into individual documents of the appropriate size. Here, the thread 90 is incorporated as a windowed thread in between first and second plies 101 and 102 of the security document 100, at least one of the plies 101 having a series of windows 91 formed therein either during the paper-making process or subsequently (e.g. by grinding). The windows 91 thereby reveal portions of the security article 90 such that the pattern P carried by the vesicular film is observable through the windows 91. Between the windows 91, sections 92 of the thread 90 are concealed by the overlying document ply 101. Alternatively, the windowing thread could be incorporated into single ply paper and produced using the method described in EP0059056.

FIG. 7 shows an alternative embodiment of a document of value 100, in which the substrate web is formed into strip articles 95 which are mounted to one side of a document substrate 101 in alignment with a window 96 which may be formed before or after application of the strip 95. The pattern P is observable through the window 96 and, depending on the construction of the substrate web from which strip 95 was constructed, it may be visible from the other side of the document 100 also. The strip 95 can be affixed to document ply 101 using an adhesive for example. As in the case of security thread 90, cutting of the substrate web into individual strips 95 may take place before or after incorporation with the document substrate 101.

FIG. 8 shows a further embodiment in which the substrate web has been formed into label articles 97 and affixed to a surface of a document 100. Here, the document substrate 101 may be opaque (e.g. paper), transparent or translucent (e.g. polymer substrate), or some combination thereof. For instance, the document substrate 101 could be transparent in the vicinity of the label 97 and substantially opaque elsewhere. As discussed below, label elements and/or transfer foils such as item 97 can be applied to a document in a number of ways and may not constitute the full layer structure of the substrate web once applied to the document of value 100.

A configuration such as that shown in FIG. 8 can alternatively be arrived at by incorporating the security element as an integral part of security document 100, in which case the document as a whole constitutes the security article. In this case the document substrate 101 is preferably a transparent polymer film and constitutes the substrate web 1, 21 in the above-described methods. The pattern P is applied directly to the substrate web using the method previously described. Other features such as a lens array may be applied to the substrate over or on the opposite side of the pattern P to form the desired optical effect. Opacifying layers may be printed across the remainder of the document surface leaving the pattern appearing in a window region.

The invention claimed is:

1. A method of manufacturing a pattern on a substrate web, comprising:
   providing a production tool having a surface relief structure of elevations and depressions, the elevations corresponding to the desired pattern to be applied to the substrate web, wherein the elevations on the surface relief structure have a minimum dimension in the range 5 to 50 microns;
   applying a curable material only onto the elevations of the surface relief structure on the production tool, and substantially not into the depressions;
   bringing the applied curable material on the surface relief structure into contact with a substrate web at a first location;
   transporting the substrate web and surface relief structure together in contact from the first location to a second location, the first and second locations being spaced from one another along the transport direction of the substrate web;
   separating the substrate web from the surface relief structure at the second location whereupon the curable material forming the pattern is affixed to and carried by the substrate web; and
   curing the curable material on the substrate web by exposure to at least one curing energy source, either while the substrate web and surface relief structure are in contact between the first and second locations and/or after the substrate web has been separated from the surface relief structure at the second location.

2. A method according to claim 1, wherein while the substrate web and surface relief structure are in contact between the first and second locations, the curable material is at least partially cured by exposure to a curing energy source such that when the substrate web is separated from the surface relief structure at the second location, the at least partially cured material forming the pattern is affixed to and carried by the substrate web.

3. A method according to claim 1, wherein the surface relief structure is substantially a cylinder and the first and second locations are spaced points on its circumference, whereby the substrate web and surface relief structure are transported along a portion of the circumference of the cylinder as the cylinder rotates, and wherein the substrate web is held in contact with the substantially cylindrical surface relief structure by a first support roller disposed upstream of the surface relief structure and a second support roller disposed downstream of the surface relief structure, the first and second support rollers applying force to the substrate web in a direction away from the centre of the substantially cylindrical surface relief structure.

4. A method according to claim 3, wherein the first and second support rollers do not give rise to a compressive force on the substrate web between each respective support roller and the substantially cylindrical surface relief structure.

5. A method according to claim 1, wherein between the first and second locations, the substrate web is held in contact with the surface relief structure by the tension of the substrate web.

6. A method according to claim 1, wherein between the first and second locations, one or more opposition rollers are provided for maintaining contact of the substrate web against the surface relief structure, the or each opposition roller applying a pressure of no more than 0.5 MPa to the substrate web between the respective opposition roller and the surface relief structure.

7. A method according to claim 1, further comprising cleaning the surface relief structure downstream of the second location to remove any excess curable material remaining after separation of the substrate web, the cleaning surface being softer than the surface relief structure.

8. A method according to claim 7, wherein the cleaning mechanism comprises a cleaning roller, a cleaning web disposed about a support roller, a flexible blade or a squeegee.

9. A method according to claim 1, wherein in its uncured state, the curable material has a viscosity in the range 0.1 to 5 Pa·s at 23 degrees C.

10. A method according to claim 1, wherein the curable material is a radiation curable material, and the curing energy source is a radiation source.

11. A method according to claim 1, wherein the curable material has an optical density greater than or equal to 0.1.

12. A method according to claim 1, wherein the curable material comprises at least one colourant which is visible under illumination within the visible spectrum.

13. A method according to claim 1, wherein the curable material comprises at least one substance which is not visible under illumination within the visible spectrum and emits in the visible spectrum under non-visible illumination.

14. A method according to claim 1, wherein the substrate web is arranged below the surface relief structure with respect to gravity, at least where the substrate web and the surface relief structure are in contact with one another.

15. A method according to claim 2, further comprising re-exposing the at least partially cured material carried on the substrate web to a curing energy source after separation of the web from the surface relief structure to fully cure the material.

16. An article comprising a substrate and a pattern formed on the substrate in accordance with the method of claim 1.

17. An article according to claim 16, further comprising an array of focussing elements, configured for viewing of the pattern therethrough.

18. An article according to claim 17, wherein the pattern comprises either:
an array of substantially identical microimages, and the pitches of the array of focusing elements and the array of microimages and their relative locations are such that the array of focusing elements cooperates with the array of microimages to generate magnified version of the microimages due to the moiré effect; or
an array of image elements, each image element representing a portion of an image, image elements from at least two different images being interleaved across the array whereby a different one of the at least two different images is directed to the viewer by the array of focusing elements depending on the viewing angle.

19. An article according to claim 16, wherein either the article is a security element; or the article is a security document.

20. An apparatus for manufacturing a pattern on a substrate web, comprising:
a production tool having a surface relief structure of elevations and depressions, the elevations corresponding to the desired pattern to be applied to the substrate web, wherein the elevations on the surface relief have a minimum dimension in the range 5 to 50 microns;
a transfer assembly adapted to apply a curable material only onto the elevations of the surface relief structure on the production tool, and substantially not into the depressions;
a transport assembly configured to:
bring the applied curable material on the surface relief structure into contact with a substrate web at a first location;
transport the substrate web and surface relief structure together in contact from the first location to a second location, the first and second locations being spaced from one another along the transport direction of the substrate web; and
separate the substrate web from the surface relief structure at the second location whereupon the curable material forming the pattern is affixed to and carried by the substrate web; and
at least one curing energy source adapted to expose the curable material to curing energy either while the substrate web and surface relief structure are in contact between the first and second locations and/or after the substrate web has been separated from the surface relief structure at the second location.

21. An apparatus according to claim 20, wherein the at least one curing energy source comprises a curing energy source adapted to expose the curable material to curing energy while the substrate web and surface relief structure are in contact between the first and second locations such that when the substrate web is separated from the surface relief structure at the second location, the at least partially cured material forming the pattern is affixed to and carried by the substrate web.

22. An apparatus according to claim 20, wherein the at least one curing energy source comprises a curing energy source adapted to expose the curable material to curing energy after the substrate web has been separated from the surface relief structure at the second location.

23. An apparatus according to claim 20, wherein the surface relief structure is substantially a cylinder and the first and second locations are spaced points on its circumference, and wherein the transport assembly comprises a first support roller disposed upstream of the surface relief structure and a second support roller disposed downstream of the surface relief structure the first and second support rollers being configured to hold the substrate web in contact with the substantially cylindrical surface relief structure, and the first and second support rollers configured to apply force to the substrate web in a direction away from the centre of the substantially cylindrical surface relief structure.

24. An apparatus according to claim 23, wherein the first and second support rollers are arranged so as not to give rise to a compressive force on the substrate web between each respective support roller and the substantially cylindrical surface relief structure.

25. An apparatus according to claim 20, wherein the transport assembly is configured so as to hold the substrate web in contact with the surface relief structure between the first and second locations by the tension of the substrate web.

26. An apparatus according to claim 20, wherein the transport assembly further comprises, one or more opposition rollers between the first and second locations adapted to maintain contact of the substrate web against the surface relief structure, the or each opposition roller being configured to apply a pressure of no more than 0.5 MPa to the substrate web between the respective opposition roller and the surface relief structure.

27. An apparatus according to claim 20, further comprising a cleaning mechanism located downstream of the second location configured to remove any excess curable material from the surface relief structure remaining after separation of the substrate web, the cleaning mechanism comprising a cleaning surface arranged to be brought into contact with the surface relief structure, the cleaning surface being softer than the surface relief structure.

28. An apparatus according to claim 20, wherein the cleaning mechanism comprises a cleaning roller, a cleaning web disposed about a support roller, a flexible blade or a squeegee.

29. An apparatus according to claim 20, wherein the substrate web is arranged below the surface relief structure with respect to gravity, at least where the substrate web and the surface relief structure are in contact with one another.

* * * * *